UNITED STATES PATENT OFFICE.

JOHN MILLER LARSEN, OF CHICAGO, ILLINOIS.

METHOD OF PRESERVING FISH.

1,322,312.      Specification of Letters Patent.      Patented Nov. 18, 1919.

No Drawing.      Application filed January 24, 1918. Serial No. 213,608.

*To all whom it may concern:*

Be it known that I, JOHN MILLER LARSEN, engineer, and machine-manufacturer, residing at 1604 Harris Trust Building, Chicago, Illinois, U. S. A., have invented certain new and useful Improvements in Methods of Preserving Fish, of which the following is a specification.

This invention relates to a method of treating fish in order to prevent or delay decomposition thereof, the method being applicable to fresh or salt water fish, and to either opened or unopened fish.

The present invention aims to provide an efficient, practical and economical method of treating fish, whereby any quantity of fish caught, within the capacity of the vessel, may be treated in such a manner as to preserve the fish in substantially the fresh state for a considerable period of time, thereby enabling the fishing vessel to remain in the vicinity of the fishing grounds until filled substantially to capacity, irrespective of the time taken, provided the same is within reasonable bounds, and without danger of infection or decomposition of the fish, the latter on the other hand, being delivered to the shore station in substantially the same condition as when first caught.

While the generally practised methods of treating fish are admittedly unsatisfactory and do not prevent decomposition of the fish for any considerable periods, the methods heretofore proposed to remedy the defects (freezing and the like), have not proved commercially and practically successful.

The object of the present invention is to provide a method of treating the fish whereby the same is maintained in a condition approximating its condition when freshly caught, without decomposition, and without impairing the quality, flavor or appearance of the fish, and also without greatly increasing the cost of handling.

The method according to this invention involves an initial treatment, preferably immediately after the fish is caught, which has for its object the prevention of the inception of infection or decomposition. That is, the present method contemplates the prevention at the outset of infection and decomposition, as distinguished from attempting to overcome or cure such infection and decomposition after the same has started, and in some cases after it has gained comparatively considerable headway. The invention also seeks to avoid the defects and objections incident to the freezing of the fish, by maintaining the fish in an unfrozen condition but at such a temperature that infection and decomposition cannot occur to any substantial or practical extent.

In practising the method of this invention, the freshly caught fish are subjected to a combined rinsing and cooling treatment in ordinary sea water, which is artificially cooled in any suitable manner to a low temperature, which to secure the best results is at the freezing point (32 degrees Fahrenheit) or thereabouts, the fish being retained in the rinsing and cooling bath for a period sufficient to cool the same down to a temperature at which bacterial activity is substantially prevented or checked, but without actually freezing the fish, the latter being then removed from the bath, and transferred to a storage room, either on the vessel or ashore, in which they are maintained at substantially the temperature to which they have been cooled, preferably about 32 degrees Fahrenheit, until required for sale or use. It will of course be obvious that instead of using ordinary sea water, or where sea water is not readily available, the rinsing and cooling treatment may be effected by the use of fresh water to which a sufficient quantity of salt has been added to enable the fish to be rapidly and efficiently cooled to the desired temperature without freezing the water.

The cooling of the salt water is preferably effected by the use of a simple and compact refrigerating machine although the water might be cooled in any other suitable manner, for example by the use of ice and salt. For practical and commercial reasons, however, a refrigerating machine is desirable and in most cases necessary. The essential feature of this part of the invention is, however, the subjecting of the fish to the action of ordinary sea water, or a salt water solution, cooled to a low temperature by artificial means. The cooled sea water may be contained in one or more tanks or receptacles into which the fish are placed, the water being replenished and screened and suitably filtered as often as may be desirable or necessary for best results, this depending upon the kind, size and quantity of fish being treated and whether the same are opened or unopened, the water requiring replenishing and filtering more often in the case of opened fish than in the case of unopened fish.

The fish after being removed from the rinsing and cooling bath may be stored in the storage rooms in boxes or other receptacles or they may be placed on racks or shelves so as to avoid heavy pressure from the weight of the fish, thus preventing bruising or disfiguring of the same.

Where the fish are stored on board the fishing vessel, the storage room will most conveniently be cooled to the desired temperature by the ship's refrigerating plant, this plant being also used to cool the sea water of the rinsing and cooling bath.

An important feature of the present method consists in the use of ordinary sea water, or an equally weak salt solution, instead of a strong concentrated brine solution, as salting of the fish is thus entirely prevented, the salt water fish being treated in its natural element cooled to the desired low temperature. The fish are also cooled by the use of salt water very much more rapidly than they could be cooled by the use of ice or cold air and this is of great importance as the fish are cooled to the temperature at which bacterial activity is prevented or checked in the shortest time possible and thus decomposition is prevented or is checked before it has reached any practical amount. Furthermore, it will be noted that the fish are cooled from within as well as from without, the cooled water in the case of unopened fish entering the same through the mouth and gills due to the circulation or movement of the water in the cooling and rinsing bath, and in the case of opened fish both the inside and the outside are exposed directly to the action of the cooling water. In the case of unopened fish it will be clear that the cooling water so chills the intestines and the food within the same that bacterial activity ceases or is so greatly retarded as to be of no real moment as long as the low temperature is maintained. In the case of opened fish the source of decomposition, namely the food in the intestines, is of course removed but any bacteria which may remain, although they may not be actually destroyed, are rendered incapable of producing infection or decomposition of the fish to any noticeable extent.

It has been found by actual tests that unopened fish treated in accordance with the present method will remain in fresh condition, approximating their condition when caught, for a period of ten days or more, the fish at the end of this period having the indications of really fresh fish, namely pink gills and bright eyes, etc., and it has also been found that opened fish treated in accordance with this method may be kept for a period of from two to four weeks and at the end of that period will be infinitely fresher in appearance and much superior in flavor to fish treated by the methods generally practised.

In view of the fact that unopened fish may thus be kept in fresh condition for an extended period, it is possible to entirely avoid opening the fish at sea, the unopened fish being cooled to the temperature at which bacterial activity ceases and held at this temperature until the vessel reaches port, where the fish may be opened and cleaned under more economical and favorable conditions, and then again similarly cooled and maintained at the low temperature until sold or used. This will avoid considerable labor at sea and will greatly reduce the crews necessary for manning the fishing vessels.

I claim:—

1. The method of treating fish to prevent or retard infection and decomposition thereof, which consists in subjecting the fish to a combined rinsing and cooling treatment in artificially cooled salt water, for a period and at a water temperature sufficiently to cool the fish to a temperature approaching the freezing point of the fish, and at which any substantial amount of bacterial activity is prevented but without freezing the fish, removing the fish from the salt water when so cooled and thereafter maintaining the fish in unfrozen condition at approximately the temperature to which it is cooled in such first step.

2. The method as claimed in claim 1, wherein the salt water is cooled to approximately 32 degrees Fahrenheit.

3. The method as claimed in claim 1, wherein ordinary sea water artificially cooled is used for the rinsing and cooling treatment.

In testimony whereof he affixes his signature.

JOHN MILLER LARSEN.